United States Patent
Vassilakis (10) Patent No.: US 8,601,119 B1
(45) Date of Patent: Dec. 3, 2013

(54) PROVIDING NAVIGATION STATISTICS

(75) Inventor: Theodore Vassilakis, Kirkland, WA (US)

(73) Assignee: Google Inc., Mountain View, CA (US)

( * ) Notice: Subject to any disclaimer, the term of this patent is extended or adjusted under 35 U.S.C. 154(b) by 75 days.

(21) Appl. No.: 13/175,061

(22) Filed: Jul. 1, 2011

Related U.S. Application Data (63) Continuation of application No. 11/693,094, filed on Mar. 29, 2007, now abandoned.

(51) Int. Cl.
*G06F 15/173* (2006.01)
*G06F 15/16* (2006.01)
*G06F 17/30* (2006.01)

(52) U.S. Cl.
USPC .............. 709/224; 709/203; 709/227; 705/10

(58) Field of Classification Search
None
See application file for complete search history.

(56) References Cited

U.S. PATENT DOCUMENTS

| | | | |
|---|---|---|---|
| 6,606,657 B1 | 8/2003 | Zilberstein et al. | |
| 6,654,749 B1 * | 11/2003 | Nashed | 707/706 |
| 7,702,671 B2 * | 4/2010 | Jacobs et al. | 707/705 |
| 2002/0072955 A1 | 6/2002 | Brock | |
| 2003/0014489 A1 | 1/2003 | Inala et al. | |
| 2004/0152477 A1 | 8/2004 | Wu et al. | |
| 2005/0030309 A1 | 2/2005 | Gettman et al. | |
| 2005/0033632 A1 | 2/2005 | Wu et al. | |
| 2006/0276997 A1 | 12/2006 | Drees | |
| 2008/0077561 A1 | 3/2008 | Yomtobian | |
| 2008/0140820 A1 | 6/2008 | Snyder et al. | |
| 2008/0313531 A1 | 12/2008 | Song et al. | |

OTHER PUBLICATIONS

Jansen et al., "How to Define Searching Session on Web Search Engine," Aug. 20, 2006.*

Jansen et al., "Defining a Session on Web Search Engines" J of the American Society for Information Science and Technology 58(6): 862-871, 2007.

* cited by examiner

*Primary Examiner* — Wen-Tai Lin

(74) *Attorney, Agent, or Firm* — Fish & Richardson P.C.

(57) ABSTRACT

Systems and methods for providing navigation statistics for a web page. Systems and methods can include a statistics engine operable to receive communications from a plurality of distributed agents and to communicate navigation statistics to the agents.

24 Claims, 9 Drawing Sheets

PROVIDING NAVIGATION STATISTICS

CROSS-REFERENCE TO RELATED APPLICATIONS

This application is a continuation application of, and claims priority to, U.S. patent application Ser. No. 11/693,094, entitled "Providing Navigation Statistics," to inventor Theodore Vassilakis, which was filed on Mar. 29, 2007. The disclosure of the foregoing application is incorporated herein by reference in its entirety.

BACKGROUND

This disclosure relates to providing navigation and/or viewing statistics to users.

Many websites are accessible through the Internet. To enhance a user experience, some websites provide navigation statistics to users. For example, web counters have been used to provide users with information on the number of users who have visited the website. Similarly, chat rooms and message boards can include visitor information containing a listing of users currently present in the chat room.

Inclusion of features can provide a much richer look and feel to a website, providing a better experience for users browsing the website and encouraging users to spend more time at a website and to return to the website. However, as features advance, these types of tools must become more sophisticated to keep up with user expectations.

SUMMARY

Systems and methods disclosed herein can provide navigation statistics to agents residing on a computing device. In one implementation, a communication from a first agent can be received, and navigation statistics associated with communications received from one or more agents can be compiled. The navigation statistics can be provided to the first agent based on the communication. The first agent, in turn, can be operable to display the navigation statistics to a user.

In another implementations, a statistics collection and distribution system can include a statistics engine and a data store. The statistics engine, for example, can receive a communication from an agent residing on a computing device, the agent being operable to provide a web viewing environment to a user associated with the computing device, and the communication comprising information about browsing activity. The data store can be operable to store navigation statistics and viewing statistics associated with the received browsing activity. The statistics engine, for example, can be operable to update the one or more data stores and to provide navigation statistics to the agent responsive to the communication.

The navigation statistics, in some example implementations, can provide notification to a user viewing a website loaded on a computing device of the popularity of a website. The navigation statistics can also provide users with enhanced information about the website, and enhance a user experience with the website.

DETAILED DESCRIPTION

Figure 1:
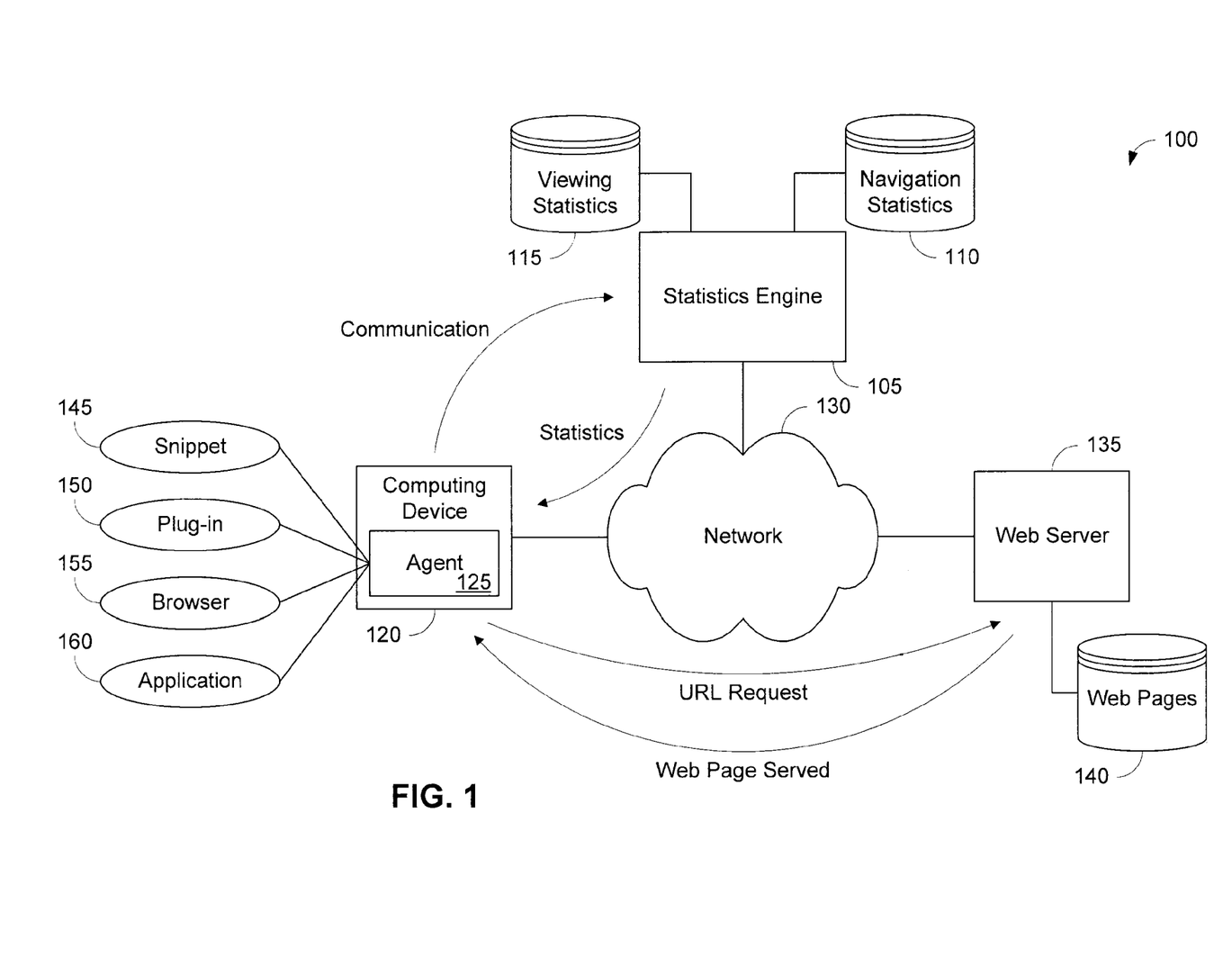
FIG. 1 is a block diagram of an example statistics engine for providing navigation statistics and viewing statistics to a user.

FIG. 1 is a block diagram of an example environment 100 including a statistics engine 105 for providing navigation statistics 110 and viewing statistics 115 to a user associated with a device (e.g., computing device 120). The navigation statistics 110 can be those statistics which show how users navigate among websites/pages on a network, such as a local area network (LAN) or a wide area network (WAN). For example, the navigation statistics 110 can include, among many others, a listing of websites linking to the current website, the pages from which people are navigating to the current website, the pages to which people are navigating from the current website, a number of searches to which the current website is relevant, a reputation rank for the current website, an average relevance to searches to which the current website is relevant, a number of users navigating to the current website from a search engine, etc.

Viewing statistics 115 can be those statistics which show the current viewership of a website. For example, viewing statistics include the number of users currently viewing the website/page, the cumulative number of times the website/page has been retrieved (viewed) by browsers, and the aliases (e.g., username, screen name, etc.) of other users currently viewing the website/page.

The computing device 120 includes an agent 125 to request and receive communications from the statistics engine 105 through the network 130. The computing device 120 can also be in communication with a web server 135 through the network 130. The computing device 120 can send universal resource locator (URL) requests to a web server 135. The web server 135 can retrieve a web page associated with the URL and communicate the web page back to the computing device 120 through the network 130.

In some implementations, the agent 125 can be a snippet of code 145 embedded into a web page. In other implementations, the agent 125 can be a standalone application 160 in communication with a browser application and the statistics engine. In other implementations, the agent 125 can be incorporated as part of a toolbar plug-in 155, such as for example, the Google Toolbar and/or Google Deskbar, available from Google Inc. of Mountain View, Calif. In other implementations, the agent 125 can be implemented as part of a browser application 155. Other agent implementations can also be used, for examples, including an operating system integration, application, toolbar, tray item, or any other instantiation operable to receive navigation statistics.

The agent 125, for example, can be operable to communicate with a statistics engine 105. The agent 125, in some examples, can send communications to the statistics engine 105. The communication can include, for example, information about a website/page currently being accessed. In some examples, the agent 125 can periodically send updated communications about the website/page currently being viewed. In other examples, the agent 125 can send updated communications triggered by a user request to navigate to a new website. In one implementation, the agent 125 can be programmed to perform a combination of periodic and triggered updates. In another implementation, the agent 125 can provide updates according to any alternative updating example, depending upon design preference of the programmer or the user.

In response to a communication received from the agent 125, the statistics engine 105 can update navigation statistics 110 and viewing statistics 115. The statistics engine 105, for example, can send navigation statistics, viewing statistics, or a combination thereof to the agent 125. Upon receipt of the navigation statistics and/or viewing statistics, the agent 125 can include the statistical information within a statistics environment provided to a user of the computing device 120. The statistics environment can include, for example, charts, tables, numbers, or listings, and combinations thereof.

In one implementation, the agent 125 can be a snippet of computer code 145 embedded within a web page served to the computing device 120. Upon loading the web page for viewing by a user, a browser can execute the code and send communications to the statistics engine. In some implementations, the user can specify the type of information returned from the statistics engine 105. In one implementation, when the agent 125 is implemented as code embedded within a webpage, each instance of browsing associated with the webpage can be captured once the webpage is loaded.

In another implementation, the agent 125 can be a standalone application 160 or a plug-in application 150 (e.g., toolbar or taskbar application). The agent 125 can, for example, include an interface to a browser application executing on the computing device 120. Using the interface, the agent 125 can determine to what website/page the browser is currently addressed and what actions are being taken by the browser as instructed, for example, by the user. The agent 125 can communicate this information to the statistics engine 120, which, in turn, can update the navigation statistics 110 and viewing statistics 115. The agent 125 can also allow the user to provide preferences for receipt and display of the information.

Figure 2:
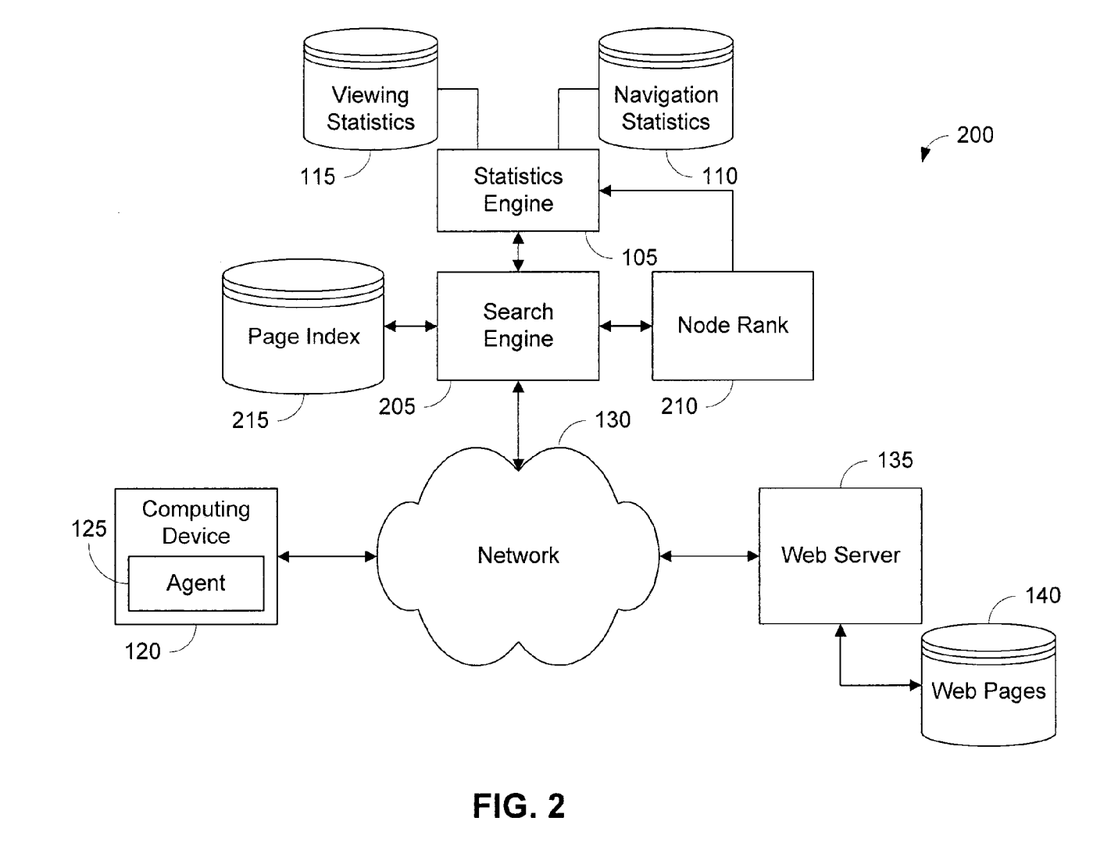
FIG. 2 is a block diagram of another example statistics engine for collecting navigation statistics and viewing statistics in conjunction with a search engine.

FIG. 2 is a block diagram illustrating an alternative example statistics engine 105 for collecting navigation statistics 110 and viewing statistics 115 in conjunction with a search engine 205. The statistics engine 105 can be associated with the search engine 205 to enable access to statistics available from the search engine 205 such as node rank 210, a page index 215 and relevance information as determined by the search engine 205, for example.

An agent 125 residing on a computing device 120 can be configured to access the statistics engine 105. Although the computing device is shown as accessing the statistics engine 105 through the search engine 205, the statistics engine 105, in other example implementations, can be accessed directly through the network. The search engine 205 is configured to receive search queries and serve search results to a querying device using the page index to determine the relevance of a page to a query (e.g., percent match to the search terms), and the node rank to derive a quality (e.g., peer reputation) associated with the page.

Knowledge of relevance and reputation can be useful to users seeking information about a subject. Thus, information about search queries can be stored in the navigation statistics 110 and statistical information can be derived from the stored information. Such statistical information can include, for example, among many others, how often a page was the termination of a search session after it had been identified as being relevant to the received search query, how often the search session continued after the page had been identified by the search engine as being relevant to the received search query, how often a page was browsed after being identified as relevant to the received search query, etc.

Moreover, the statistics engine 105 can, for example, also collect data directly from an agent 125 executed by a computing device 120. The agent 125 can operate to provide current browsing information from the computing device 120 to the statistics engine 105. The agent 125 can also operate to receive updated navigation and/or viewing statistics from the statistics engine 105 and to provide the navigation and/or viewing statistics to a user of the computing device 120.

Figure 3:
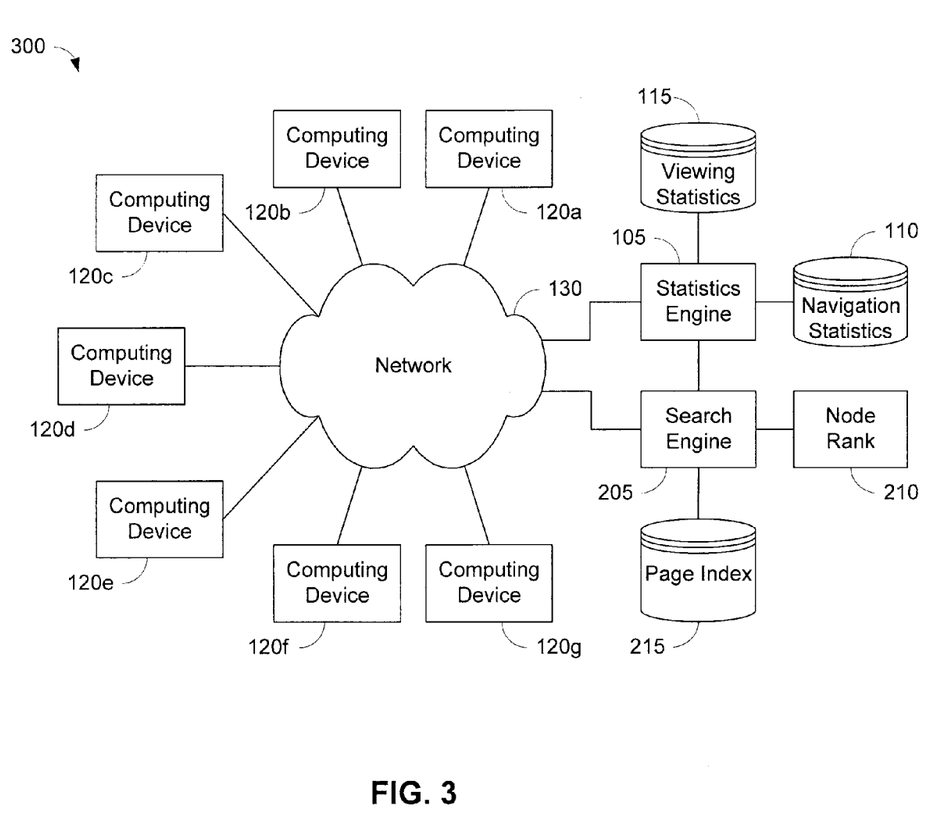
FIG. 3 is a block diagram illustrating the collection of statistical data from multiple sources.

FIG. 3 is a block diagram illustrating an environment 300 used to collect statistical data from multiple sources. The statistics engine 105 can collect navigation statistics 110 and viewing statistics 115 and can, for example, utilize a distributed architecture to collect statistical information from many different sources. For example, when similar agents are executed by a number of computing devices 120a-g, each of the computing devices 120a-g are operable to provide information to the statistics engine 105 that can be used in the computation of viewing statistics 115 and/or navigation statistics 110. As described above, the agent executed by the computing devices 120a-g can be implemented by any computer executable code operable to communicate information to the statistics engine 105.

In some implementations, the agent can be operable to receive information from the statistics engine 105. For example, if the agent is a snippet of code embedded within a web page, the computing devices 120 that have retrieved the web page with the embedded code can communicate information to the statistics engine 105. Likewise, if the agent is an application, the computing devices 120 that are currently executing the agent application can communicate information to the statistics engine 105.

The statistics engine 105 can also receive navigation statistics 110 and/or viewing statistics 115 from a search engine 205. For example, the search engine 205 can receive search queries from any of the computing devices 120a-g, and can parse the queries and provide search results based upon, for example, a page index 215 and the node rank 210. The search engine 205 can also be configured to provide abstracted and/or aggregated search information to the statistics engine 105. The search information can, for example, be processed by the statistics engine 105 and stored to navigation statistics 110 or to viewing statistics 115. The search engine 205 can also provide node rank 210 information to the statistics engine for storage to the navigation statistics 110.

Figure 4:
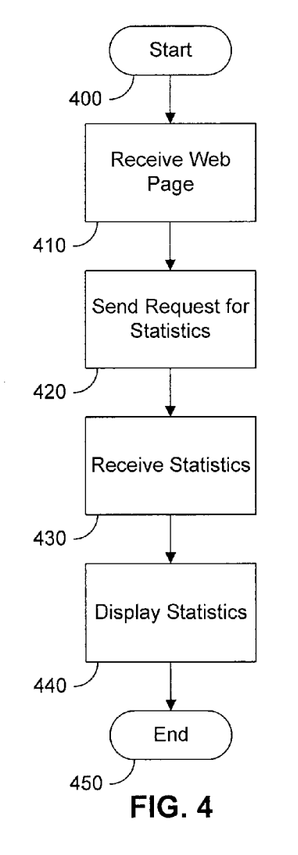
FIG. 4 is a flowchart illustrating an example method for providing statistics to a user.

FIG. 4 is a flowchart illustrating an example method for providing statistics to a user. The method begins at start block 400. At stage 410, a web page is received. The web page can be received through a network (e.g., network 130 of FIG. 1) from a web server (e.g., web server 135 of FIG. 1) by a web browser operating on a computing device (e.g., computing device 120 of FIG. 1). The web browser can load the received web page and provide an interpreted version of the web page to the user for viewing.

At stage 420, a request is sent for statistics. The request can be sent, for example, to a statistics server or statistics engine (e.g., statistics engine 105 of FIG. 1). In some examples, the request is sent based upon the receipt of the web page in stage 410. The request can be originated by an agent (e.g., agent 125 of FIG. 1). In one implementation, the agent can be a program instance caused by the loading of a snippet of code embedded within the web page, and can communicate information to the statistics engine. In another implementation, the agent can be a standalone or plug-in application instance, for example, that retrieves information from a browser instance and sends the information to a statistics engine.

At stage 430, statistics are received. The statistics can be received, for example, by an agent (e.g., agent 125 of FIG. 1) from a statistics engine (e.g., statistics engine 105 of FIG. 1) through a network (e.g., network 130 of FIG. 1). The statistics can be received in any format that is operable to be received by the receiving agent. In examples where the agent is an instance launched by a snippet of code embedded into the web page, the format for the communication can be a markup language (e.g., html, xml, etc.) format, a javascript (.js) format, or some other browser-related format.

At stage 440, the statistics are displayed. The statistics can be displayed, for example, by a computing device (e.g., computing device 120 of FIG. 1) responsive to instructions received from an agent (e.g., agent 125 of FIG. 1) operating on the computing device. The agent can, for example, interpret the statistics received from a statistics engine (e.g., statistics engine 105 of FIG. 1) and generate a graphical environment for display to a user using the computing device. The method ends at terminus block 450.

Figure 5:
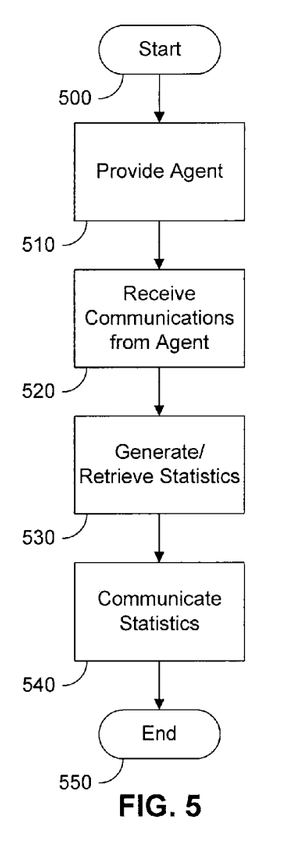
FIG. 5 is a flowchart illustrating another example method for providing statistics to a user.

FIG. 5 is a flowchart illustrating an alternative example method for providing statistics to a user. The method begins at start block 500. At stage 510, an agent is provided. The agent can be provided, for example, to computing devices (e.g., computing devices 120 of FIG. 1) through a web publisher that embeds a snippet of code (e.g., snippet 145 of FIG. 1) within web pages (e.g., web pages 140 of FIG. 1). In some implementations, the agent can be provided to the web publisher using a custom site dedicated to distribution of the snippet of code. In other implementations, the agent can be provided to the web publisher using Google AdSense™, or Google Analytics™, or Google Webmaster Central™, all available from Google Inc. of Mountain View, Calif. Other distribution systems can also be used. The web pages including the embedded agent can be served to the computing devices based upon receiving a URL request from the computing devices. In other implementations, the agent can be provided to computing devices (e.g., computing devices 120 of FIG. 1) as a standalone application (e.g., standalone 160 of FIG. 1), as a plug-in application (e.g., 150 of FIG. 1), or as part of the browser application (e.g., browser 155 of FIG. 1), or otherwise provided.

At stage 520, a communication is received from the agent. The communication can be received, for example, by a statistics server or statistics engine (e.g., statistics engine 105 of FIG. 1) from the agent (e.g., agent 125 of FIG. 1) through a network (e.g., network 130 of FIG. 1). In one implementation, the communication can include information about a web page that a browser associated with the agent is currently browsing. The browser can be installed on a computing device (e.g., computing device 120 of FIG. 1), which can be, for example, a computer, a personal digital assistant, a mobile communications device (e.g., cellular phone, mobile e-mail device, etc.), among many others. The communication can also include, for example, a recent browsing or searching history, or other information.

At stage 530, statistics are retrieved and/or generated. A statistics engine (e.g., statistics engine 105) can retrieve data from a data store (e.g., navigation statistics 110, viewing statistics 115, etc.) and generate statistics related to a web page associated with a received communication (e.g., stage 520). For example, the statistics can be retrieved from a data store (e.g., navigation statistics 110, viewing statistics 115, etc.).

In some examples, the generated statistics can be based upon a computing device (e.g., computing device 120 of FIG. 1) that originated a received communication. For example, a user of a computing device can define preferences for the types of statistical data of interest to the user. Alternatively, an entire set of statistical data can be generated.

At stage 540, the statistics are communicated. The statistics can be communicated, for example, by a statistics server or statistics engine (e.g., statistics engine 105 of FIG. 1) to an agent (e.g., agent 125 of FIG. 1) operating on a computing device (e.g., computing device 120 of FIG. 1) through a network (e.g., network 130 of FIG. 1). In one implementation, the statistics include only those statistics for which a user of the computing device has indicated a preference. In other implementations, an entire set of statistical data is communicated to an agent (e.g., agent 125 of FIG. 1), and the agent can filter the statistical data prior to presentation to a user using a computing device (e.g., computing device 120 of FIG. 1). The method ends at terminus block 550.

Figure 6:
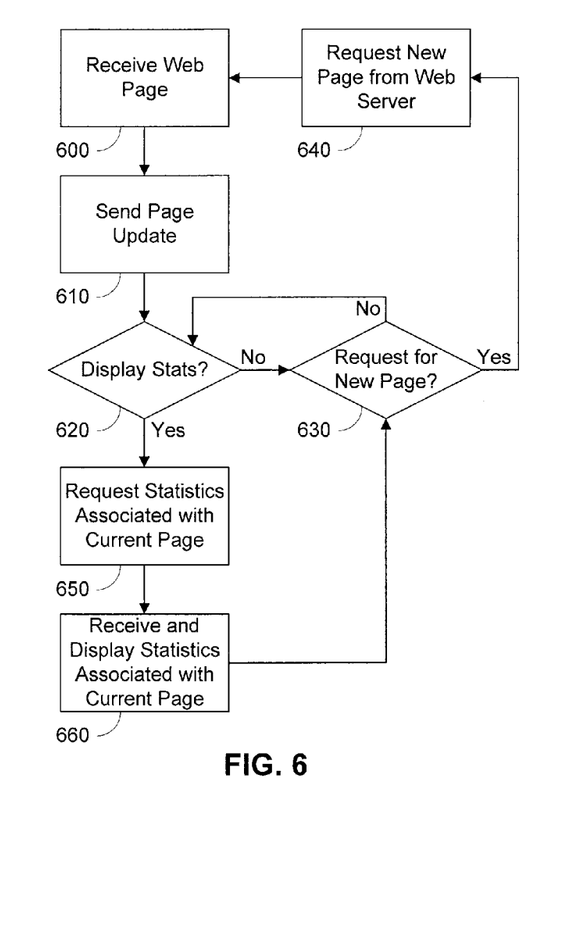
FIG. 6 is a flowchart illustrating an example method for retrieval of navigation and viewing statistics.

FIG. 6 is a flowchart illustrating an example method for retrieval of navigation and viewing statistics. At stage 600, a web page is received. The web page can be received, for example, from a web server (e.g., web server 135 of FIG. 1) by a web browser operating on a computing device (e.g., computing device 120 of FIG. 1) through a network (e.g., network 130 of FIG. 1). The web browser can load the received web page and provide an interpreted version of the web page to the user for viewing on the computing device.

At stage 610, a page update can be sent. The page update can be sent through a network (e.g., network 130 of FIG. 1) to a statistics server or statistics engine (e.g., statistics engine 105 of FIG. 1) from an agent (e.g., agent 125 of FIG. 1) operating on a computing device (e.g., computing device 120 of FIG. 1). The page update can be triggered, for example, by the receipt of a new web page. In another implementation, the page update can be sent based upon other triggers (e.g., a periodic time period). The page update can include, for example, information about current and/or previous browsing activities of a browser associated with the agent.

At stage 620, it is determined whether statistics are to be displayed. The determination can be made based upon whether a user has indicated a preference for whether statistics about the current web page are to be displayed by a computing device (e.g., computing device 120 of FIG. 1). The preference can be input, for example, using an agent (e.g., agent 125 of FIG. 1), or using a browser associated with the computing device.

If it is determined that the statistics are not to be displayed, then stage 620 determines whether there is a request for a new web page. A request for a new web page can be indicated for example by the origination of a URL request from a browser associated with a computing device (e.g., computing device 120 of FIG. 1). Upon detecting a request for a new web page, a request can be sent to the web server at stage 640. A request (e.g., a URL request) can be issued by a web browser executing on a computing device (e.g., computing device 120 of FIG. 1). The method can then return to stage 600, where a web page is received. If there is no request for a new web page at stage 630, the method returns to stage 620.

If it is determined that the statistics are to be displayed, a request for statistics associated with the current page is made at stage 650. The request can be made, for example, by an agent (e.g., agent 125 of FIG. 1) operating upon a computing device (e.g., computing device 120 of FIG. 1), and can be sent to a statistics server (e.g., statistics engine 105 of FIG. 1). The request can request specific types of statistics based upon a user's preferences provided to the agent through the computing device. In another implementation, the request can specify an entire set of statistics associated with the current page.

At stage 660, statistics associated with the current page are received and displayed. The statistics can be received, for example, by an agent (e.g., agent 125 of FIG. 1) from a statistics engine (e.g., statistics engine 105 of FIG. 1) through a network (e.g., network 130 of FIG. 1). The statistics can be received in any format that is operable to be received by the receiving agent. For example, if the agent is an instance launched by a snippet of code embedded into the web page, the format for the communication can be a markup language (e.g., html, xml, etc.) format, or a javascript (.js) format.

The method then determines whether there has been a request for a new page at stage 630. If there has been no request for a new page, the method proceeds to stage 620, where it is determined whether statistics are to be displayed. It should be noted that in some examples, the determination of whether statistics are to be displayed can serve as a determination of whether to update the display with new statistics. Returning to stage 630, if there is a request for a new web page, the method proceeds to request the new web page from the server at stage 640, and receives the requested web page at stage 600.

Figure 7:
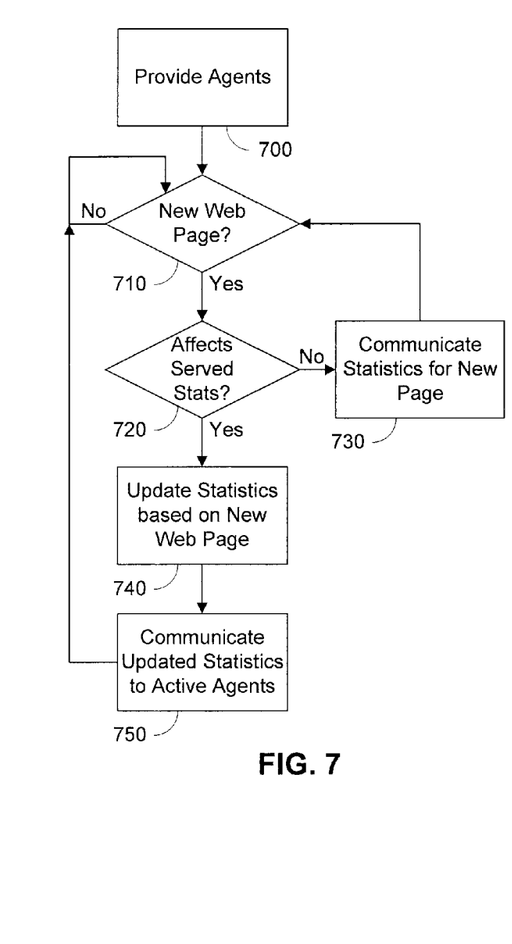
FIG. 7 is a flowchart illustrating an example method for the communication of statistics to a user.

FIG. 7 is a flowchart illustrating an example method for the communication of statistics to a user. At stage 700, agents are provided. The agent can be provided, for example, to computing devices (e.g., computing devices 120 of FIG. 1) through a web publisher that embeds a snippet of code (e.g., snippet 145 of FIG. 1) within their web pages (e.g., web pages 140 of FIG. 1). The web pages are then served to the computing devices based upon receiving a URL request from the computing devices. Alternatively, the agent can be provided to computing devices (e.g., computing devices 120 of FIG. 1) as a standalone application (e.g., standalone 160 of FIG. 1), as a plug-in application (e.g., 150 of FIG. 1), or as part of the browser application (e.g., browser 155 of FIG. 1), or by some other provisioning process.

At stage 710, a determination is made whether a new web page has been requested by the user. The determination can be made based upon receiving a communication from an agent (e.g. agent 125 of FIG. 1) operating upon a device (e.g., computing device 120 of FIG. 1) associated with the user. The communication can, for example, be received through a network (e.g., network 130 of FIG. 1). If there has been no new web page requested, the method waits for a communication indicating a new web page has been requested.

Upon detection of a request for a new web page, a determination is made whether the new web page affects served statistics at stage 720. This determination can be made, for example, by a statistics engine (e.g., statistics engine 105 of FIG. 1), and can be based upon whether statistics served to other active agents are affected by the request of the current page. For example, if a user is the only person viewing a new web page, other agents are not affected by the new page. As another example, if an existing viewer is simultaneously leaving the web page as the user is requesting the web page, the statistics for the page might not be affected.

If the new web page does not affect the served statistics, the statistics for the new web page can be communicated at stage 730. The statistics can be communicated, for example, by a statistics server or statistics engine (e.g., statistics engine 105 of FIG. 1). The statistics can, for example, be communicated to an agent (e.g., agent 125 of FIG. 1) operating upon a device (e.g. computing device 120 of FIG. 1) using a network (e.g., network 130 of FIG. 1). In an implementation, the statistics can be filtered based upon predefined user preferences, or based upon user preferences received in a communication from the agent upon detecting a request for a new web page. The method then returns to stage 710 to determine whether a new page is requested.

Returning to stage 720, if the new web page does affect served statistics, the method proceeds to stage 740 and the statistics are updated based upon the new web page. The statistics, for example, can be updated by a statistics engine (e.g., statistics engine 105 of FIG. 1). The statistics can be updated based upon information received from an agent (e.g., agent 125 of FIG. 1) operating upon a device (e.g., computing device 120 of FIG. 1) through a network (e.g., network 130 of FIG. 1).

At stage 750, the updated statistics are communicated to the active agents. The statistics can be communicated by a statistics server or statistics engine (e.g., statistics engine 105 of FIG. 1) to agents (e.g., agent 125 of FIG. 1) through a network (e.g., network 130 of FIG. 1). Active agents can be, for example, those agents that are currently receiving statistics associated with the web page. Thus, the statistics in some examples can be updated and pushed to users browsing the website in real-time as the statistical data changes based upon new users browsing the website or existing users leaving the website. Moreover, the agent, in some implementations, can update both viewing statistics (e.g., number of users and identities of users) and navigation statistics (e.g., how users arrived at the page, number of searches for which the page is relevant, percent hit rate from searches for which the page is relevant, etc.).

Figure 8:
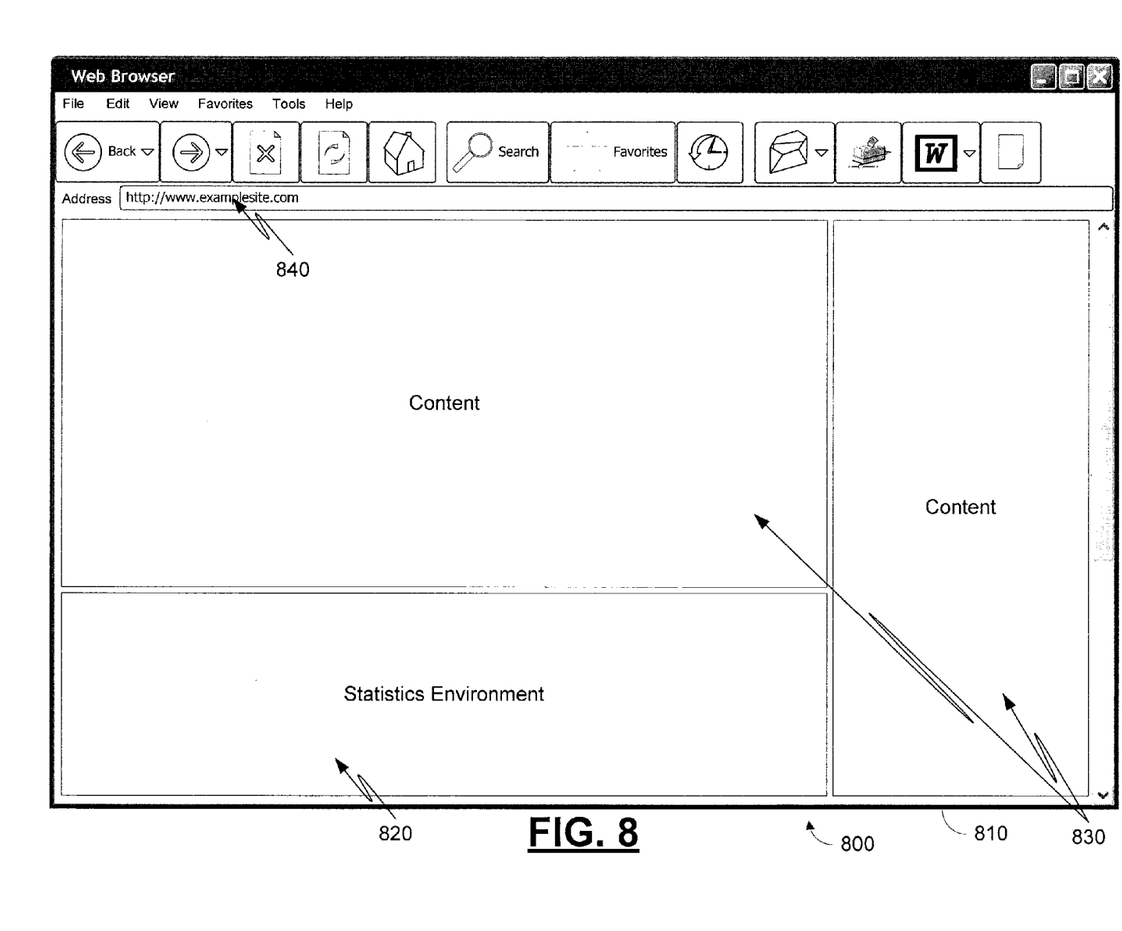
FIG. 8 is a screen shot illustrating an example of a browser instantiation including a statistics environment within a website environment.

FIG. 8 is a screen shot 800 illustrating an example of a browser instantiation 810 that includes a statistics environment 820. The screen shot 800 includes an example of a web browser 810. A myriad of web browsers are publicly available, including Internet Explorer, available from Microsoft, Corp. of Redmond, Wash., and Firefox available from Mozilla Corporation of Mountain View, Calif.

A user can use the web browser 810 to retrieve web pages from servers operating on a network by entering a URL into an "Address" field representation 840. The address represents the internet address of a web server that can be accessed through the network. The URL can represent an abstraction of the address, which can be resolved, for example, by a domain name server. The web server can respond to the URL request by serving the web page indicated by the URL.

Upon receipt of the web page, the browser 810 can load the web page by interpreting the code (e.g., html code, java, etc.) representing the web page. Typically web pages include some content 830 which can be organized in some fashion within a browser viewing environment. In some examples, the web page can include a snippet of code inserted into the web page by a publisher of the web page. The snippet, upon loading by the browser, can cause an instantiation of an agent. The agent, for example, can communicate browsing information to a statistics server or statistics engine. The agent can also, for example, receive statistics from the statistic engine. Upon receipt of the statistics, the agent can generate a statistics environment 820 within the web page. The statistics environment 820 can be configured, for example, to provide a graphical display to the user, the graphical display including a rendition the statistics received from the statistics server or statistics engine. The graphical rendition can in some instances be made configurable by the user. In some implementations, the statistics environment can be provided, for example, using an iframe similar to the iframe provided by Google AdSense™, available from Google Inc. of Mountain View, Calif.

Figure 9:
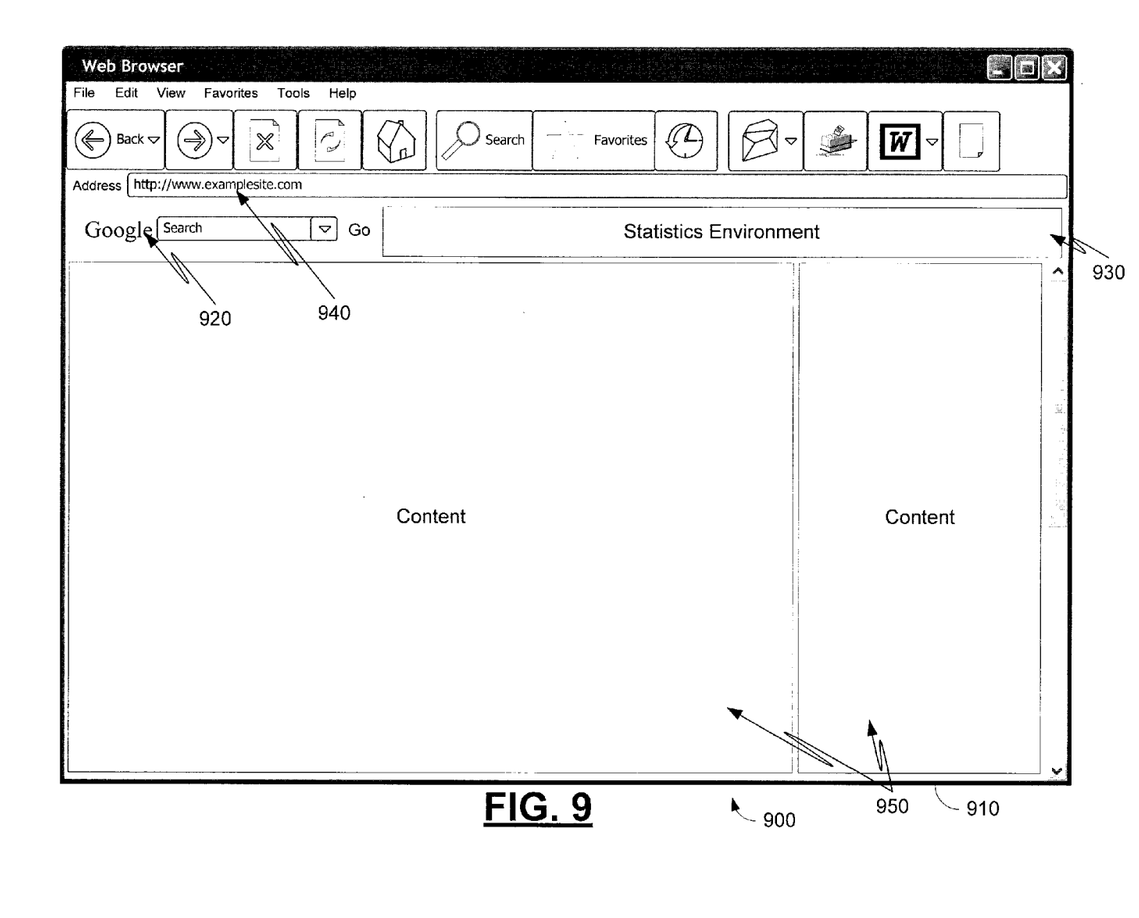
FIG. 9 is a screen shot illustrating an example of a browser instantiation having a toolbar application including a statistics environment.

FIG. 9 is a screen shot 900 illustrating an example of a browser representation 910 having a toolbar representation 920 including a statistics environment 930. The toolbar representation 920 can be rendered, for example, by a plug-in application that operates in conjunction with a browser application. Many popular plug-in toolbars exist for browser applications. In the example shown by the screen shot 900, a Google Toolbar, available from Google Inc. of Mountain View, Calif., is shown.

The toolbar can include an agent operable to communicate browsing information to a statistics engine. The statistics engine can use the browsing information to update navigation statistics and viewing statistics associated with a web page, such as, for example, the web page indicated in an "Address" field representation 940 of the browser representation 910. In some examples, the toolbar representation 920 can include a statistics environment 930. The statistics environment can be controlled and updated, for example, by an agent operating in conjunction with the toolbar plug-in application. The statistics environment can includes information about a web page such as the web page currently being browsed (e.g., as indicated by the "Address" field representation 940). In examples where the statistics environment is part of the toolbar representation, the web page can use a larger portion of the browser environment for displaying content 950.

Figure 10:
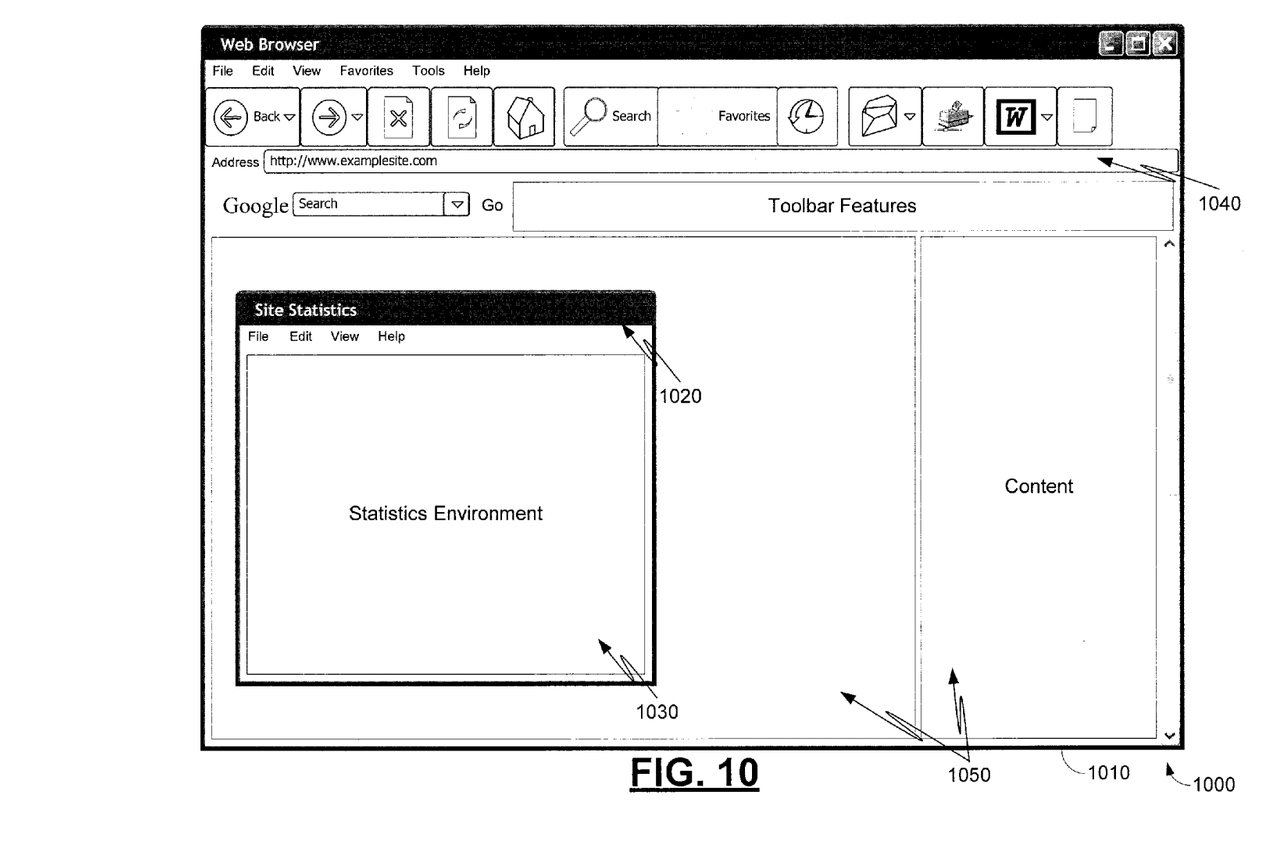
FIG. 10 is a screen shot illustrating an example of a statistics application producing a statistics environment.

FIG. 10 is a screen shot 1000 illustrating an example of a browser representation 1010 and a statistics application representation 1020 which includes a statistics environment 1030. In some implementations, the standalone application can be used to communicate browsing information (e.g., current and/or previous) to a statistics engine. Moreover, the standalone application can, for example, receive statistical information from a statistics server or statistics engine through a network connection.

The standalone application can include an interface to the browser application which enables the standalone application to retrieve or receive browsing information from the browser. Browsing information can include a currently browsed website, such as can be indicated by an "Address" field representation 1040 of the browser representation 1010.

The standalone application can also operate to produce the statistics application representation 1020 as well as to generate the statistics environment 1030. The statistics environment 1030 can include, for example, any statistics received from the statistics server or statistics engine. The standalone application can also be programmed to enable a user to provide preferences for the types of statistical information to be included within the statistical environment.

Figure 11:
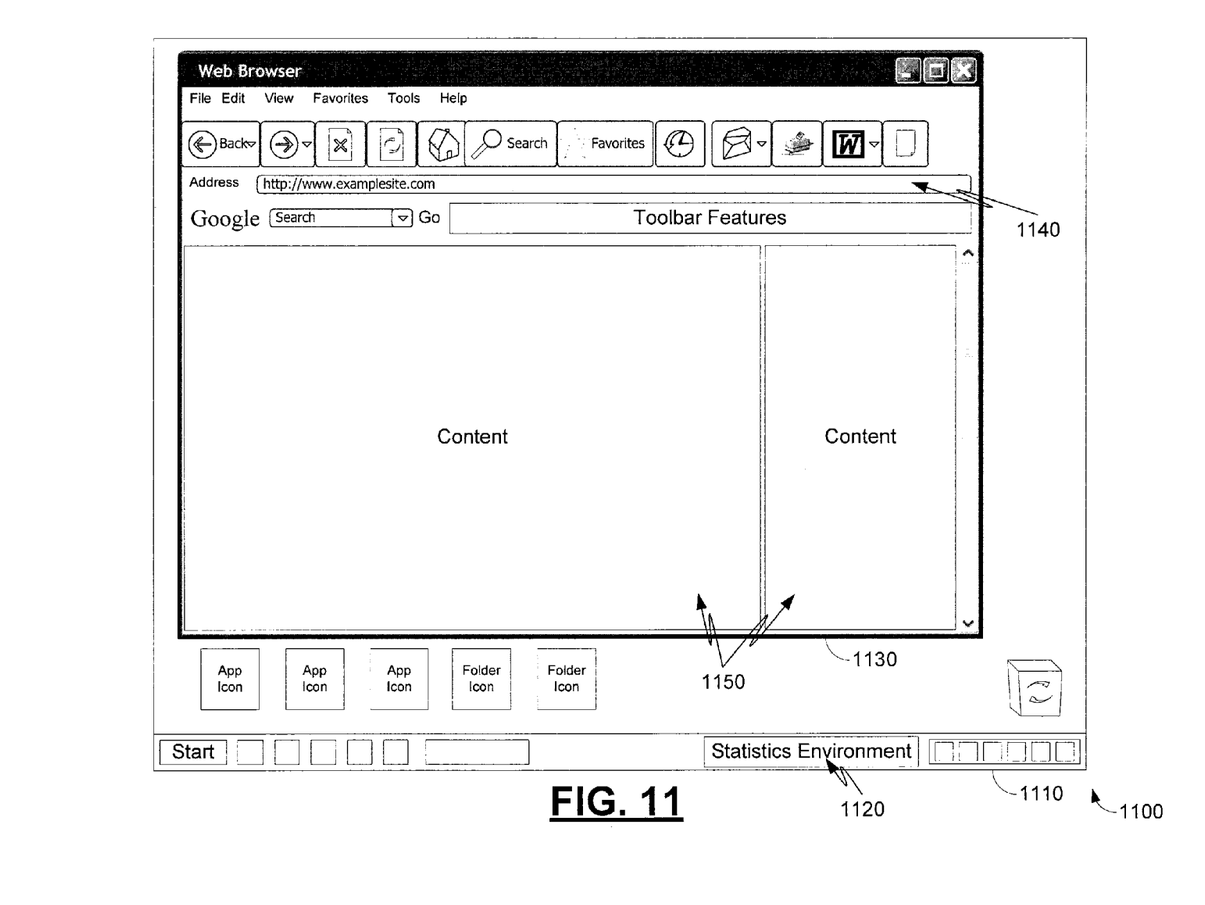
FIG. 11 is a screen shot illustrating an example of a user interface environment including statistics environment.

FIG. 11 is a screen shot 1100 illustrating an example of a user interface environment 1110 including statistics environment 1120. In this example, a statistics environment 1120 can be included as part of a taskbar plug-in application. Taskbar plug-in applications are widely available, such as for example, the Google Deskbar, available from Google Inc. of Mountain View, Calif., shown in the user interface environment 1110.

The taskbar plug-in application can include an agent operable to communicate with a statistics server or statistics engine to provide updated browsing information to the statistics engine, such as for example, the currently browsed web page as indicated by an "Address" field representation 1140. The agent, in some examples, can include an interface to a browsing application, thereby facilitating the collection of browsing information for communication to the statistics engine.

The agent can also be configured, in some examples, to receive statistics from the statistics server or statistics engine to the agent. The agent can generate the statistics environment 1120 including a graphical display of the statistical data for display to a user. The agent, for example, can be configurable by the user to filter certain types of data, or to provide a specific look and feel to the statistics environment as specified by the user through the taskbar plug-in application. The graphical user interface environment is operable to provide a browser representation 1130 including the content 1150 of the currently browsed web page as indicated by the "Address" field representation 1140.

Systems and methods disclosed herein may use data signals conveyed using networks (e.g., local area network, wide area network, internet, etc.), fiber optic medium, carrier waves, wireless networks, etc. for communication with one or more data processing devices (e.g., statistics engine 105, computing device 125, web server 135, etc.). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed is:

1. A method, comprising:
   receiving a first communication from a first agent, the first communication corresponding to a request for a web page;
   obtaining, using one or more processors, navigation statistics and search query statistics for the web page, the navigation statistics being computed based on other communications received from one or more other agents, the search query statistics being derived from the navigation statistics, the search query statistics measuring user selections of the web page from search results for a received search query, the search query statistics specifying a value based on user selections of the web page from search results, the selections being received in response to the web page being identified as relevant to the search queries, the search query statistics further specifying a value representing a frequency with which the user selections of the web page corresponded to termination of a search session; and
   providing, using one or more processors, the navigation statistics and the search query statistics to the first agent based on the first communication, wherein the first agent is operable to separately display the navigation statistics and the search query statistics for the web page provided to a user.

2. The method of claim 1, wherein the first agent is a browser application.

3. The method of claim 2, wherein the one or more other agents include the browser application.

4. The method of claim 1, wherein the first agent is a plug-in application.

5. The method of claim 1, further comprising providing an instruction set to a web publisher for inclusion in a publisher web page, the instruction set being operable to generate a statistics viewing display comprising the first agent upon loading of the publisher web page.

6. The method of claim 5, further comprising updating the navigation statistics based upon additional communications received from the one or more agents.

7. The method of claim 6, further comprising periodically sending the updated navigation statistics provided to the first agent.

8. The method of claim 1, further comprising compiling viewing statistics identifying a number of agents viewing the web page.

9. The method of claim 1, further comprising:
   displaying a statistics viewing environment comprising the first agent in a browser environment; and
   displaying a content item comprising the navigation statistics associated with a website within the statistics viewing environment.

10. A statistics collection and distribution system, comprising:
    a statistics engine operable to receive a communication from an agent residing on a computing device and further operable to receive data from a search engine, the agent being operable to provide a web viewing environment to a user associated with the computing device, and the communication comprising information about browsing activity, the communication corresponding to a request for a web page;
    one or more data stores being operable to store navigation statistics, search query statistics for the web page and a search query, and viewing statistics associated with received browsing activity, the search query statistics being derived from the navigation statistics, the search query statistics measuring user selections of the web page from search results for a received search query;
    the statistics engine being operable to update said one or more data stores and to provide navigation statistics and separate search query statistics to the agent responsive to the communication; and
    a search engine interface operable to interface with a search engine, the interface being operable to receive search query statistics from the search engine and to store the search query statistics to said one or more data stores, the search query statistics specifying a value based on user selections of the web page from search results, the selections being received in response to the web page being identified as relevant to the search queries, the search query statistics further specifying a value representing a frequency with which the user selections of the web page corresponded to termination of a search session.

11. The system of claim 10, further comprising a distributed network of agents operable to provide browsing information back to the statistics engine.

12. The system of claim 11, wherein the distributed network of agents are operable to provide a statistics viewing environment to computing devices, the statistics viewing environment being operable to display navigation statistics and query statistics to users associated with the computing devices.

13. The system of claim 11, wherein the distributed network of agents comprise code snippets operable to be embedded within a web page by a web server, and executed by a computing device upon loading the web page.

14. The system of claim 11, wherein the distributed network of agents comprise applications operable to receive browsing information from web browsers associated with computing devices.

15. The system of claim 14, wherein the applications comprise plug-in applications associated with the web browsers.

16. The system of claim 10, wherein the statistics engine is further operable to provide viewing statistics to the agent responsive to the communication.

17. The system of claim 10, wherein the statistics engine is further operable to periodically send updated navigation statistics and query statistics to the agent.

18. The system of claim 17, wherein the agent periodically send a communication to the statistics engine, the communication comprising current browsing information and requesting updated statistics.

19. One or more non-transitory computer readable storage media storing instructions that are executable by a processing device, and upon such execution cause the processing device to perform operations comprising:
    identifying a web page presentation related to a web page;
    obtaining navigation statistics and search query statistics for an identified web page presentation and a search query, the search query statistics being derived from the navigation statistics, the search query statistics specifying a value based on user selections of the web page from search results, the selections being received in response to the web page being identified as relevant to a received search query, the search query statistics further specifying a value representing a frequency with which the user selections of the web page that correspond to termination of a search session;
    providing the navigation statistics and the search query statistics to a statistics viewing instance; and
    repeating the identifying, compiling and providing processes for a duration of the statistics viewing instance.

20. A system, comprising:
a user device including a first agent; and
one or more computers configured to interact with the user device, the one or more computers being further configured to:
    receive a first communication from the first agent, the first communication corresponding to a request for a web page;
    obtain navigation statistics and search query statistics for the web page, the navigation statistics being computed based on other communications received from one or more other agents, the search query statistics being derived from the navigation statistics, the search query statistics measuring user selections of the web page from search results for a received search query, the search query statistics specifying a value based on user selections of the web page from search results, the selections being received in response to the web page being identified as relevant to the search queries, the search query statistics further specifying a value representing a frequency with which the user selections of the web page corresponded to termination of a search session; and
    provide the navigation statistics and the search query statistics to the first agent based on the first communication, wherein the first agent is operable to separately display the navigation statistics and the search query statistics for the web page provided to a user.

21. The system of claim 20, wherein the one or more computers are further configured to provide an instruction set to a web publisher for inclusion in a publisher web page, the instruction set being operable to generate a statistics viewing display upon loading of the publisher web page by the user device.

22. The system of claim 21, wherein the one or more computers are further configured to update the navigation statistics based upon other communications received from the user device.

23. The system of claim 22, wherein the one or more computers are further configured to periodically send the updated navigation statistics to the user device.

24. The system of claim 20, wherein the one or more computers are further configured to compile viewing statistics identifying a number of users to whom the web page is currently presented.

* * * * *